(12) United States Patent
Lengers (10) Patent No.: US 9,764,855 B2
(45) Date of Patent: Sep. 19, 2017

(54) EXTERIOR STRUCTURE COMPONENT FOR AN AIRCRAFT, AIRCRAFT WITH AN EXTERIOR STRUCTURE COMPONENT, AND METHOD FOR MANUFACTURING AN EXTERIOR STRUCTURE COMPONENT FOR AN AIRCRAFT

(71) Applicant: Airbus Operations GmbH, Hamburg (DE)

(72) Inventor: Matthias Lengers, Bremen (DE)

(73) Assignee: Airbus Operations GmbH (DE)

( * ) Notice: Subject to any disclaimer, the term of this patent is extended or adjusted under 35 U.S.C. 154(b) by 391 days.

(21) Appl. No.: 14/242,962

(22) Filed: Apr. 2, 2014

(65) Prior Publication Data

US 2014/0301095 A1    Oct. 9, 2014

(30) Foreign Application Priority Data

Apr. 4, 2013    (DE) .................. 10 2013 103 369

(51) Int. Cl.
*B64D 47/06*    (2006.01)
*B29D 11/00*    (2006.01)
*B64D 47/02*    (2006.01)

(52) U.S. Cl.
CPC ........ *B64D 47/06* (2013.01); *B29D 11/00673* (2013.01); *B64D 47/02* (2013.01); *B64D 2203/00* (2013.01); *Y10T 156/1056* (2015.01)

(58) Field of Classification Search
CPC .... B64D 47/06; B64D 47/02; B64D 2203/00; F21W 2101/06
USPC .... 385/120, 147, 12, 13; 362/554, 556, 555, 362/582, 576, 470
See application file for complete search history.

(56) References Cited

U.S. PATENT DOCUMENTS

| | | | |
|---|---|---|---|
| 3,723,722 A | 3/1973 | Van Iderstine et al. | |
| 4,537,469 A | 8/1985 | Kircher | |
| 4,957,576 A * | 9/1990 | Fischer ................ | G02B 6/4471 156/166 |
| 5,452,186 A * | 9/1995 | Dassanayake ....... | G02B 6/0006 362/23.15 |

(Continued)

FOREIGN PATENT DOCUMENTS

| | | |
|---|---|---|
| DE | 10 2007 029 140 A1 | 1/2009 |
| DE | 10 2009 049 112 A1 | 4/2011 |
| DE | 10 2010 039 153 A1 | 2/2012 |

OTHER PUBLICATIONS

German Office Action dated May 7, 2015.

*Primary Examiner* — Robert May
*Assistant Examiner* — Leah S Macchiarolo
(74) *Attorney, Agent, or Firm* — Lerner, David, Littenberg, Krumholz & Mentlik, LLP (57) ABSTRACT

An exterior structure component for an aircraft with an illuminating device includes a structure with an interior side and an exterior surface with at least one illuminated region and a multitude of optical fibers that extend from the interior side to the at least one illuminated region of the exterior surface. The optical fibers end on the interior side of the exterior structure component in a common interface area that is couplable to an illuminating device. The structure is made from a fiber composite material in which the optical fibers are integrated. In this manner a particularly weight-saving illuminating device that is capable of withstanding external influences may be provided.

14 Claims, 5 Drawing Sheets

(56) References Cited

U.S. PATENT DOCUMENTS

| | | | | |
|---|---|---|---|---|
| 5,525,796 A | * | 6/1996 | Haake | B64D 45/00 |
| | | | | 250/227.14 |
| 5,690,408 A | | 11/1997 | de la Pena et al. | |
| 5,713,654 A | * | 2/1998 | Scifres | G02B 6/0001 |
| | | | | 340/435 |
| 6,152,588 A | | 11/2000 | Scifres | |
| 6,244,728 B1 | | 6/2001 | Cote et al. | |
| 8,398,281 B2 | | 3/2013 | Geudner et al. | |
| 2002/0159275 A1 | * | 10/2002 | Nicholls | A63C 19/02 |
| | | | | 362/559 |
| 2004/0258388 A1 | * | 12/2004 | Kim | D05C 15/00 |
| | | | | 385/147 |
| 2010/0254153 A1 | * | 10/2010 | Hama | A61B 1/0653 |
| | | | | 362/551 |
| 2013/0301997 A1 | | 11/2013 | Brownjohn et al. | |

\* cited by examiner

EXTERIOR STRUCTURE COMPONENT FOR AN AIRCRAFT, AIRCRAFT WITH AN EXTERIOR STRUCTURE COMPONENT, AND METHOD FOR MANUFACTURING AN EXTERIOR STRUCTURE COMPONENT FOR AN AIRCRAFT

TECHNICAL FIELD

The invention relates to an exterior structure component for an aircraft with an illuminating device, to an aircraft comprising an exterior structure component with an illuminating device, and to a method for manufacturing an exterior structure component of an aircraft.

BACKGROUND OF THE INVENTION

For visual identification of aircraft, certification requirements for aircraft specify the operation of navigation lights that serve the purpose of indicating the presence, the position and a flight direction or roll direction so that collisions may be avoided. The navigation lights include sidelights of different coloring, a tail light and various stroboscope lights for identification of the aircraft at night.

BRIEF SUMMARY OF THE INVENTION

Apart from the reliability of operation of the navigation lights the lightest-possible weight must be achieved so that the greatest-possible efficiency of the aircraft may be ensured. An aspect of the invention proposes an illuminating device for an aircraft that provides the best-possible reliability and the lightest-possible weight.

Proposed is an exterior structure component of an aircraft with an illuminating device, comprising a structure with an interior side and an exterior surface with at least one illuminated region, and a multitude of optical fibers that extend from the interior side of the structure to the at least one illuminated region of the exterior surface, wherein the optical fibers on the interior side of the exterior structure component end in a common interface area that is couplable to an illuminating device, and wherein the structure is made from a fiber composite material in which the optical fibers have been integrated.

The exterior structure component is to be considered an integral part of the aircraft that forms part of the exterior structure perceivable from the exterior. In this arrangement the exterior structure is to be considered to be the formative structure of the aircraft, which structure, apart from the fuselage with an external skin, the wing halves and components arranged thereon, also comprises control units and fairings. Accordingly, it is not mandatory for the exterior structure component to be designed to absorb or provide a significant structural force; instead it may be merely a component that is effective in increasing the aerodynamic efficiency. Consequently, the aim is to provide an illuminating device as an integral component of the aircraft, wherein the actual light source need not be arranged on the exterior of the exterior structure component, but instead may also be arranged in the interior of the aircraft. The light beams to be emitted to the environment are transmitted by the illuminating device, by way of optical fibers, to the so-called illuminated region. The mechanical requirements in terms of the installation space required for active illuminating devices arranged in situ, and the installation of mechanical protective devices may thus be saved particularly advantageously.

The use of a multitude of optical fibers significantly increases the redundancy and thus the reliability of the actual illuminating device. Any failure of an optical fiber is to be considered an improbable singularity that has only an insignificant effect on the illumination effect that is providable. Spatial separation of the illuminated region from the actual illuminating device makes it possible to outstandingly safeguard the illuminating device against mechanical influences from the aircraft's environment. In addition, the reliability of the illuminating device may be increased by simply increasing the redundancy, because it is easily possible to optically couple more than just one illuminating device at the same time or switchably to the optical fibers.

The optical fibers are linear dimensionally-elastic bodies that preferably comprise a polymer material and guide light through reflection on the boundary surface of the optical fiber by way of total reflection due to a lower refractive index of the medium surrounding the fiber-optic light guide or by way of mirroring the boundary surface. Particularly preferably the optical fibers comprise PMMA or polycarbonate; however, they may also comprise other synthetic materials, a natural mineral fiber material, for example ulexite, or a glass material, for example a quartz glass. The ends of the optical fibers are preferably polished; they comprise a smooth, planar or curved surface so that a desired beam behavior of the individual optical fibers is obtained.

In a furthermore advantageous embodiment the exterior structure component comprises a fiber composite material with at least one fiber layer and with a matrix material, wherein the optical fibers are integrated in the fiber composite material. It is possible, for example, to manufacture fiber composite materials in a negative mould by successive laying of fibers and applying a layer of the matrix material. Integration of the optical fibers may be understood as the optical fibers forming an integral part of the exterior structure component, which may take place, for example, by the insertion of optical fibers in the fiber layer, by laying or weaving-in, as an alternative or in addition also by laminating onto a fully-laid fiber layer. This results in outstanding integration of the optical fiber in the exterior structure component. As an alternative or in addition to this, in the case of already finished fiber layers, prepregs or semi-finished products, optical fibers may also penetrate the fiber layer, the prepreg or the semi-finished product. This makes it possible to achieve simple alignment of the optical fibers essentially perpendicularly or at an angle on a perpendicular relative to the fiber layer of the exterior structure component.

Furthermore, as an alternative or in addition to the aforesaid, optical fibers may also multiply penetrate the semi-finished product, a laid fiber layer or a prepreg while carrying out a change in direction in order to improve the strength of the exterior structure component. This may be of interest in particular when the exterior structure component comprises a sandwich material in which a core layer is enclosed by two layers of fiber composite material that act as cover layers.

The optical fibers extend from an interior side to the exterior surface of the exterior structure component in that they penetrate or pierce the material of the exterior structure component at least in a region around the illuminated region. During manufacture of the particular exterior structure component the optical fibers may already be integrated in the material of the exterior structure component so that with a clever arrangement of the optical fibers said material may experience a partial mechanical reinforcement while the additional weight resulting from the integration of the optical fibers is, however, hardly noticeable. Apart from integration in a structure comprising a fiber-matrix-composite material by laying into the fiber material, the laminating in or on, the optical fibers may also be cast into a structure or inserted into holes specially provided for this purpose and may be bonded or sealed. The direction of the light beams emitted respectively depends on the alignment of the end of the optical fiber in the illuminated region. If beaming perpendicularly to the exterior surface is desired, the end of the optical fiber, which end is situated in the illuminated region, must therefore be arranged so as to be perpendicular to the exterior surface.

As a result of integration of the optical fibers the exterior structure component, instead of comprising an active illuminating device, may comprise a significantly simpler design in the illuminated region that no longer needs to provide a receiving device, for example for gas discharge lamps, LEDs and other illuminants. Apart from simplification of manufacture, this clearly reduces costs. The integration of the actual illuminating device on the interior side of the exterior structure component may continue to take place at such a location that permits easy installation without however requiring an expensive redesign.

In an advantageous embodiment the illuminating device is a laser. A laser is a particularly effective light source that emits a strongly directional, uniform and coherent light beam of a discrete wavelength. Furthermore, a laser is characterized by its stability and its low tendency to lose illumination performance. Apart from using an independent laser whose laser beam is optically coupled into the optical fibers, generating the laser beam may also take place within the optical fiber. This requires the use of a laser pump that is optically coupled to the optical fibers, wherein the material of the optical fibers is suitable as a laser medium in which a population inversion of electrons may be achieved on the energy supply by the laser pump. The design of the optical fibers in each case as a resonator with a mirrored and a partially mirrored end surface thus makes it possible to generate and emit laser beams in a weight-saving manner. For example, an erbium-doped quartz glass may be a material of an optical fiber which material is suitable for this purpose. As an alternative to this, the use of some other light source that emits a strongly directional light is also suitable, for example a high-performance LED, a gas discharge lamp or similar light sources that may be equipped with suitable optics for coupling the light into the optical fibers.

In an advantageous embodiment the exterior structure component comprises at least one reference axis relative to which the optical fibers at their ends situated in the illuminated region in each case encompass at least one beam angle, wherein the totality of the beam angles spans an angular range that is at least 90 degrees in width. The optical fibers end on the exterior surface of the exterior structure component in an illuminated region. In this arrangement the light beams emitted by the individual optical fibers have a direction that preferably directly depends on the local orientation of the respective end of the optical fiber. This beam angle may have an acute, slender conical form. If it is desired, for example in the case of navigation lights, to cover particular beam angle ranges for example in a vertical direction and in a horizontal direction, a corresponding orientation of the ends of the optical fibers in the illuminated region is necessary for this so that the totality of all the beam angles covers a predetermined beam angle range. In order to ensure particularly uniform radiation over the desired beam angle ranges a uniform angle distribution of the totality of the ends of the optical fibers should take place. In terms of reference axes that are suitable for the definition of the beam directions, it would be possible, for example, to use parallels to the x-, y- or z-axis of an aircraft's fixed coordinate system, with the particular exterior structure component having an orientation to said reference axes as prescribed by its type and use. In this arrangement the desired beam angle range may be predetermined by a certification requirement according to EASA, JAA or FAA.

For example, illumination intensities relating to navigation lights in various spatial directions are specified by EASA in its "Certification Specifications for Large Aeroplanes (CS-25)", paragraphs CS 25.1389 to CS 25.1393. Accordingly, left-hand and right-hand navigation lights shall have specified minimum intensities relative to a vertical plane parallel to the longitudinal axis of the aircraft, towards the outside of the respective side in a range of 0° to 110°, which illumination intensities are gradated depending on the angle. In an angular range of 0° to 10° for example at least 41 candela are prescribed, while in an angular range of 10° to 20° at least 31 candela are prescribed. However, in a further angular range of 20° to 110° only at least 5 candela are required. A rear light in an angular range of a total of 140°, in other words towards each side in an angular range of in each case 110° to 180° has a minimum intensity of 20 candela. Furthermore, graduated minimum illumination intensities of navigation lights on a horizontal plane of the aircraft in the vertical direction in an angular range of 0° to 90° are required. It could therefore make sense to design the illuminating device to span an angular range that is at least 90° wide.

It is also possible for smaller angular ranges to be sensible. The illuminating device may, for example, comprise several illuminating devices in the form of individual bundles of optical fibers, each spanning an individual sub-region of this angular range. For example, a group of illuminating devices would be imaginable, which group comprises a first illuminating device with a first bundle of optical fibers, wherein the width of the thus spanned angular range is 10° and the illumination intensity is at least 41 candela. The ends of the optical fibers are preferably oriented so as to be uniformly distributed over the angular range so that this first illuminating device may implement the first angular range of 0° to 10°. A second illuminating device with a second bundle of optical fibers could span an angular range of a width of also 10°, wherein the illumination intensity is at least 31 candela. This may be implemented in that the second illuminating device while having identically-oriented ends of the optical fibers as the first illuminating device, nevertheless has a slightly reduced number of optical fibers when compared to the first illuminating device. Finally, a third illuminating device with a third bundle of optical fibers may be provided, wherein the ends of the optical fibers span a significantly wider angular range of 90°, and the number of optical fibers is selected such that with uniform orientation of the ends of the optical fibers a uniform illumination intensity of at least 5 candela over the angular range is implemented.

In an advantageous embodiment the optical fibers have been combined to form a multitude of fiber bundles, each comprising a discrete beam direction, wherein the beam directions of all the fiber bundles encompass at least one specified beam angle range. As a result of the combination of optical fibers to form fiber bundles the manufacture of the exterior structure component may be simplified, in particular in the case of exterior structure components which do not easily permit integration of the optical fibers during manufacture by laminating in or integrating in semi-finished fiber products. This may, for example, relate to exterior structure components made from a metallic material. It may be recommendable to provide ends of individual fiber bundles in each case with an optically functional cover which comprises, for example, a convex shape and which achieves a targeted widening of the beam angle range. Thus it may no longer be mandatory to orient the individual fibers or the fiber bundles.

It may be advantageous to design the exterior structure component on the exterior surface in the illuminated region with a translucent layer. The aforesaid may achieve protection of the light-emitting ends of the optical fibers in the illuminated region. At the same time the light emitted by the ends of the optical fibers may be uniformly distributed, in particular when the translucent layer is opaque.

Furthermore, the translucent layer could comprise a curved surface that causes widening or diffusion of the beam angle range. By means of this effect, which is based on a magnifying glass effect, the size of the individual illumination points may be enlarged so that the illumination intensity resulting from the illuminating device is reduced, which, in particular, protects ground staff against excessively dazzling light.

In a further advantageous embodiment a phosphorescent layer is arranged on the exterior surface of the exterior structure component in the illuminated region, which phosphorescent layer is excited to become luminous by impinging light beams from the optical fibers. This causes a very uniform emission of light at the desired wavelength.

Particularly advantageously the exterior structure component may be designed as a wing-end shape, for example a sharklet. The illuminating device is integrated in the wing-end shape. Because of the extremely space-saving guidance of light the wing-end shape does not require any geometric boundary conditions to be observed in terms of the size and shape of the illuminating devices. This freedom may be advantageous in the design of the aerodynamic surfaces.

Furthermore advantageously the exterior structure component may be designed as a section of a vertical stabilizer of an aircraft. In this manner navigation lights may be implemented on the vertical stabilizer, in particular on an upper end of a leading edge of the vertical stabilizer.

Further advantages of the exterior structure component relate to better detectability as a result of significantly increased directionality when compared to active illuminating devices; a feature that, in particular, increases the range of the navigation lights that may be implemented in this manner. The optical fibers further make it possible to flexibly design and use static illumination and stroboscope lights that by means of a shared set of optical fibers may also be combined. If heating of the optical fibers is clearly noticeable, it may make sense to position them so that they automatically carry out de-icing of an endangered region. The separation of the illuminating device from the illuminated region supports the replacement of defective illuminants without this requiring expensive dismantling at an exterior surface of an aircraft, which would always require the correct restoration of a seal to protect against water ingress.

The invention further relates to an aircraft that comprises at least one exterior structure component with the characteristics and advantages described above. Overall, the aircraft is lighter in weight than aircraft comprising conventional illuminating devices on exterior structure components. Nevertheless, the reliability is not impeded; instead, as a result of the redundancy of the illuminating device said reliability may even be significantly improved. The smoother surface on the exterior structure components, which surface does not have to accommodate active illuminating devices, improves the airflow around the aircraft.

The invention further relates to a method for manufacturing an exterior structure component with an illuminating device according to the further independent claim. The essential characteristics consist of the provision of a structure with an interior side and an exterior side with at least one illuminated region, the integration of a multitude of optical fibers in the structure in such a manner that they extend from the interior side to the at least one illuminated region of the exterior surface. In an advantageous embodiment the provision of the structure comprises the manufacture of a semi-finished product from a fiber composite material, wherein integration of the optical fibers comprises at least single penetration of the semi-finished product with the optical fibers in order to increase the strength of the structure. Moreover, it is advantageous to let the optical fibers, after integration in the structure, project beyond the exterior surface in order to, on completion of the structure, shorten said optical fibers so that they are flush with the exterior surface. Subsequently, a translucent protective layer or alternatively a phosphorescent layer may be applied.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1:
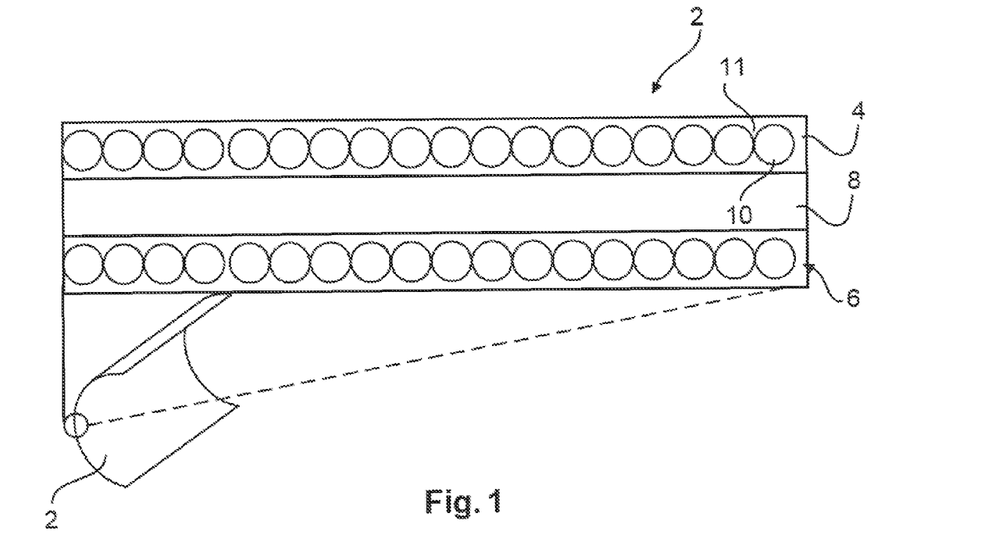
FIG. 1 shows a partial section view of an exterior structure component without an optical fiber.

FIG. 1 shows a partial section view of an exterior structure component 2 comprising a fiber composite material with a first cover layer 4, a second cover layer 6 and a core layer 8 arranged in between. The first and the second cover layers 4, 6 have been made of a fiber composite material and comprise a multitude of fibers 10 that are embedded in a matrix material 11 and may, for example, be carbon fibers or glass fibers. By arranging the lightest possible core layer 8 it is possible, despite the light weight, to achieve a very high area moment of inertia of the exterior structure component 2, which suggests itself in particular in the manufacture of components subjected to airflow in the transonic range. Initially, the type of the exterior structure component 2 is of no relevance; any desired exterior structure component 2 of an aircraft may be equipped with an illuminating device. Hereinafter, with reference to a single optical fiber, the manufacture of an illuminating device with a multitude of optical fibers is described. It should be noted that the courses of the optical fibers are only shown diagrammatically; in the implementation of a product they need to be adapted to the characteristics of the material of the optical fiber in order to prevent the occurrence of damage to the optical fibers during integration in an exterior structure component.

Figure 2:
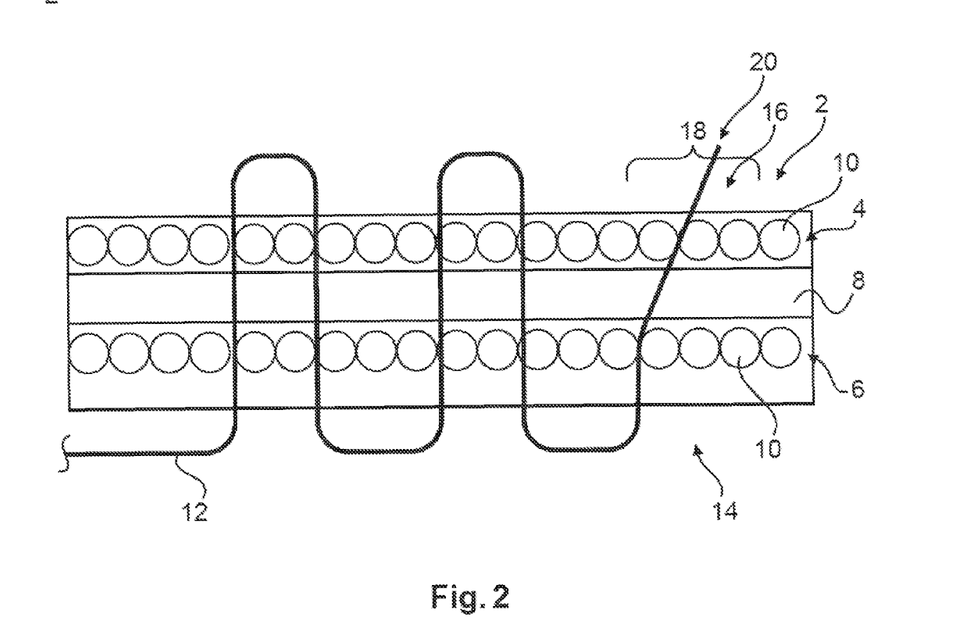
FIG. 2 shows a partial section view of an exterior structure component with a pierced-through optical fiber.

FIG. 2 shows the exterior structure component 2 during integration of an optical fiber 12 that extends from an interior side 14 of the exterior structure component 2 to an exterior surface 16 in an illuminated region 18. Integration takes place, for example, by multiply piercing the not-yet-cured structure of the exterior structure component 2 in such a manner that alternately, as is the case in a sewing process, the second cover layer 6 and the first cover layer 4 are pierced with the optical fiber 12. One end 20 of the optical fiber 12 projects beyond the first cover layer 4 and thus beyond the exterior surface 16 and may be shortened on completion of the process of manufacturing the exterior structure component 2.

The orientation of the end 20 of the optical fiber 12 dictates the direction of the emitted light. By corresponding orientation of the end 20 it is thus possible to influence the beam direction of the light, which may, for example, take place by tool-guided piercing of the structure with the optical fiber 12.

Figure 3:
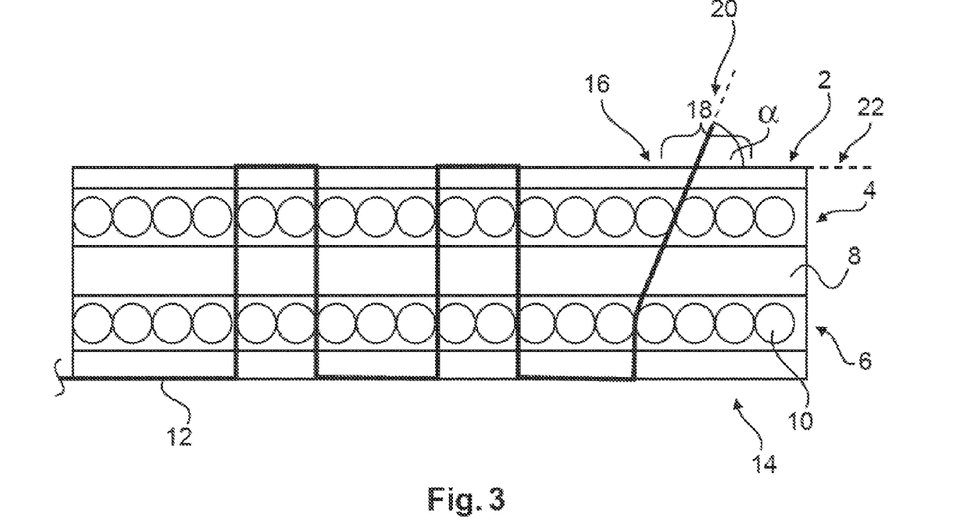
FIG. 3 shows a partial section view of an exterior structure component with a tightened optical fiber.

FIG. 3 shows the arrangement, tightened after piercing, of the optical fiber 12 in the exterior structure component 2 and the desired alignment of the end 20, which optical fiber encompasses, for example, an angle α relative to a reference axis 22 that extends parallel to the local exterior surface 16. The reference axis 22 is only shown as an example; it may correlate with an axis of an aircraft's fixed coordinate system. This will be dealt with in more detail in FIG. 8.

The tightened arrangement of the optical fiber 12 results in a significant reinforcement of the mechanical structure of the exterior structure component 2. This is noticeable in particular with the use of a large multitude of optical fibers 12.

Figure 4:
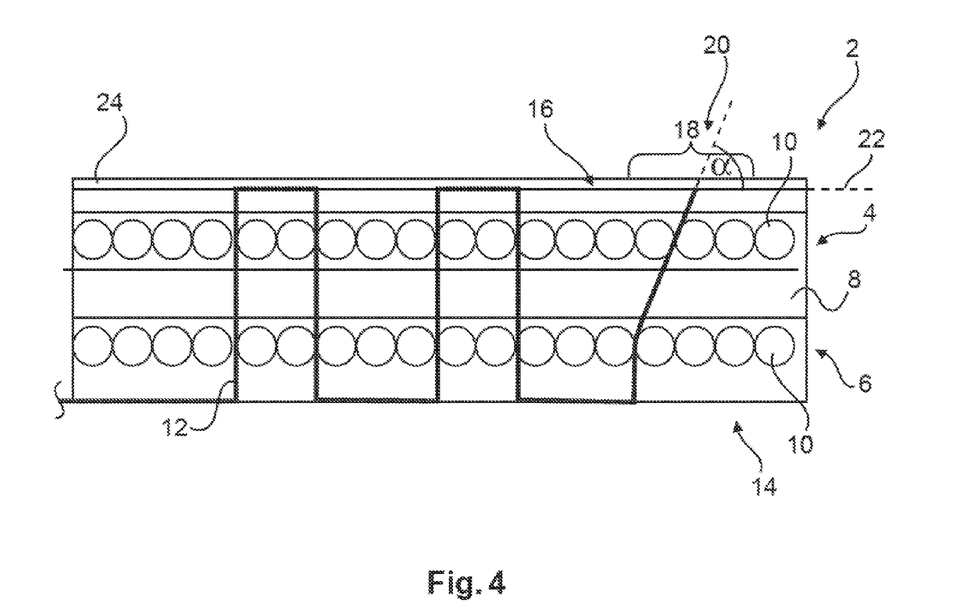
FIG. 4 shows a partial section view of an exterior structure component with an optical fiber and a protective layer.

FIG. 4 shows a shortened end 20 of the optical fiber 12 and a translucent protective layer 24 applied to the exterior surface 16, which protective layer 24 protects the ends 20 of the optical fibers 12 from environmental influences and in particular from humidity. The protective layer 24 could be designed so as to be completely transparent, or as an alternative so as to be translucent in order to provide improved distribution of light in the manner of a diffuser.

Figure 5:
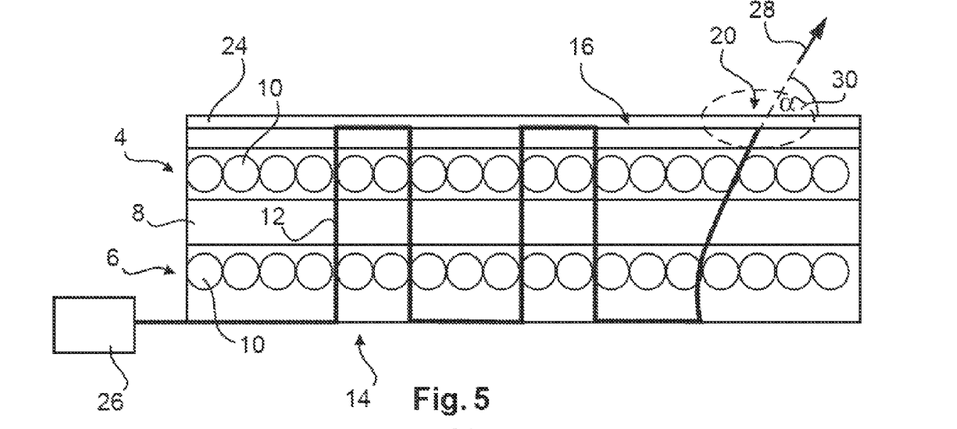
FIG. 5 shows a partial section view of an exterior structure component with an optical fiber and an optically-coupled illuminating device.

By means of the illuminating device 26 shown in FIG. 5 light may be coupled into the optical fiber 12. The illuminating device 26 may be designed singly or multiply in order to positively influence a desired redundancy and thus reliability. In a transparent design the protective layer 24 preferably causes a directed light beam 28 to be emitted from the end 20 of the optical fiber 12, while in a translucent design a wider, more diffused, light spot 30, indicated by dashed lines in FIG. 5, with a larger beam angle range would result.

Figure 6A:
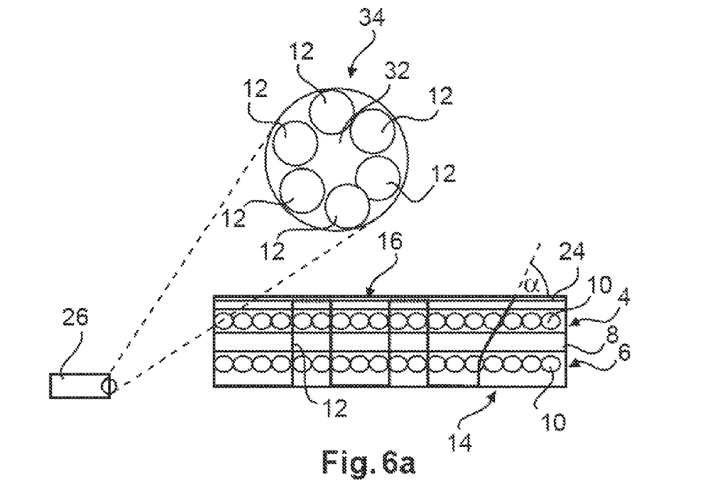
FIGS. 6a to 6c show partial section views and a diagrammatic view of an exterior structure component with optical fibers with a circular optical interface.
Figure 6B:
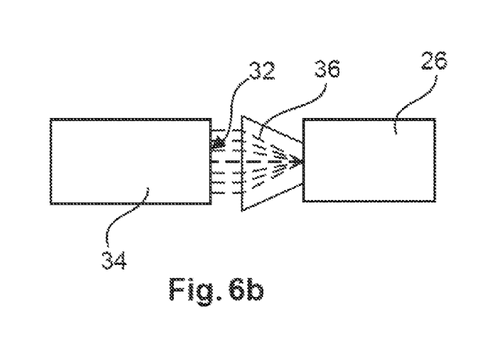
Figure 6C:
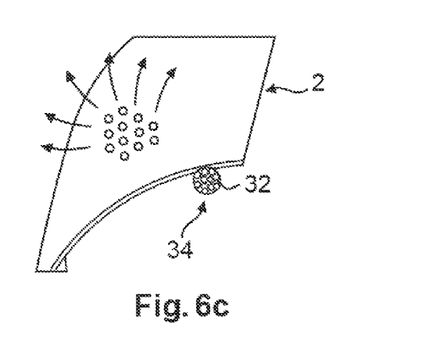

The introduction of light requires the provision of an interface 32 that is couplable to the illuminating device 26. For example, FIG. 6a shows an interface 32, which for example is circular, in which several optical fibers 12 are bundled to form a fiber bundle 34 and by transmitting light emit a light beam at each of their respective ends 20. As shown in FIG. 6b, for transmitting light to the interface 32 in the case of strong alignment of the light of an illuminating device 26 it is necessary to use a light-guide cone 36 that widens the light beam emitted by the illuminating device 26. FIG. 6c shows that the integration of a circular interface 32 results in guiding a fiber bundle 34 outside the exterior structure component to the illuminating device 26.

Figure 7A:
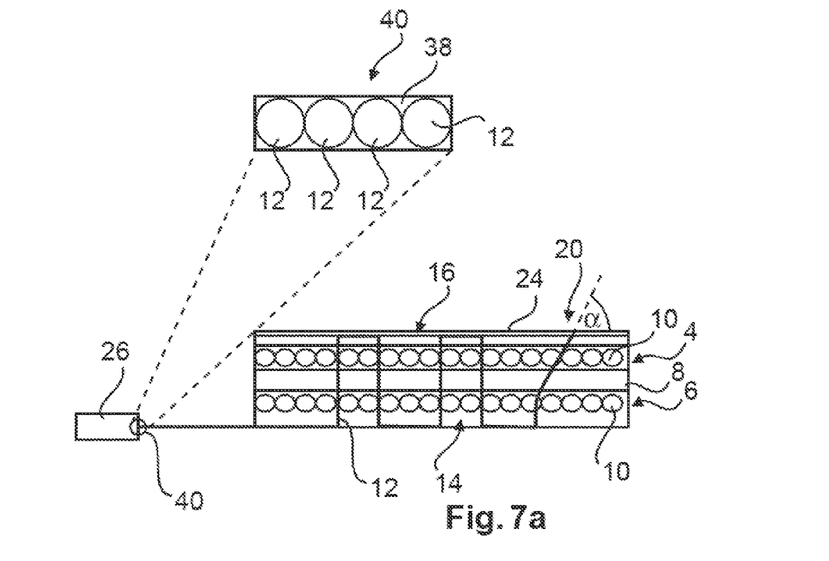
FIGS. 7a to 7c show partial section views and a diagrammatic view of an exterior structure component with optical fibers with a rectangular optical interface.
Figure 7B:
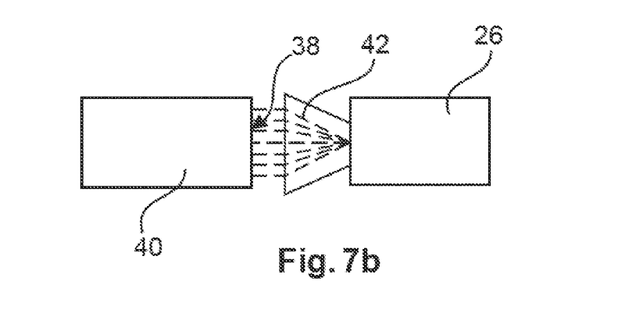
Figure 7C:
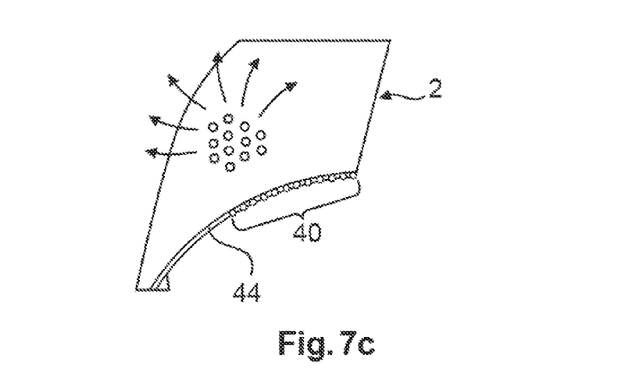

The analogous illustrations of FIGS. 7a to 7c show a fiber bundle 38 that leads to a rectangular interface 40 which could end at a boundary edge of an exterior structure component 2, as shown in FIG. 7c. By means of mechanical integration of the exterior structure component 2, in a particularly advantageous embodiment optical coupling could be achieved automatically. The use of a rectangular or flattened interface 40 provides a particular advantage in that the interface 40 may be directly integrated in a structure 44 of the exterior structure component 2. The distance between the two cover layers 4 and 6, which distance is, for example, shown in FIG. 1, may be sufficient to accommodate the interface 40. A light-guide cone 42, analogous to the light-guide cone 36, may be used to widen the light beam emitted by the light emitting device 26.

Figure 8:
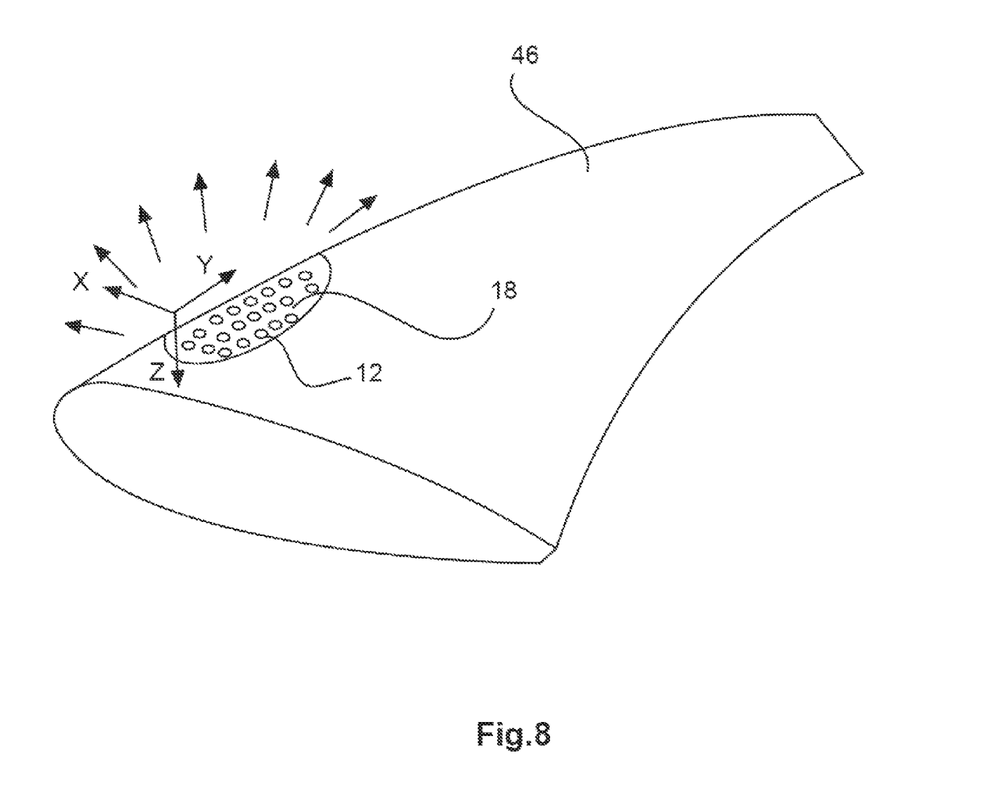
FIG. 8 shows an exemplary exterior structure component with set beam angles.

Finally, FIG. 8 shows an example of an exterior structure component 46 in the form of a wing-end shape, for example of a sharklet, which comprises a lighting region 18 with a multitude of individual optical fibers 12. In order to set the desired beam angle ranges the ends of the optical fibers 12 are individually oriented. The totality of the optical fibers 12 encompasses predetermined angular ranges in particular in the horizontal plane and in the vertical plane, which angular ranges in an aircraft are, for example, defined by the aircraft's fixed x-y plane and the y-z plane. By adapting the number and orientation of the ends of the optical fibers 12 it is thus possible to adjust the illumination intensities depending on the respective beam angle. The higher the desired intensity in one beam direction, the greater the number of optical fibers 12 that are aligned in this beam direction. Finally, the lighting region 18 may be coated by a translucent and/or phosphorescent protective layer. The reference axis 22, which in FIGS. 3 and 4 is shown as an example, may coincide with one of the axes of an aircraft's fixed coordinate system.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. An exterior structure component for an aircraft with an illuminating device, comprising:
   a structure with an interior side and an exterior surface with at least one illuminated region; and
   a multitude of optical fibers extending from the interior side to the at least one illuminated region of the exterior surface,
   wherein the optical fibers end on the interior side of the exterior structure component in a common interface area couplable to an illuminating device,
   wherein the structure is made from a semi-finished structural product of a fiber composite material in which the optical fibers have been integrated, and wherein for increasing the strength of the structure each optical fiber is sewn into the semi-finished structural product by multiply piercing the semi-finished structural product such that each optical fiber alternately extends from the interior side of the structure to the exterior surface in the illuminated region.

2. The exterior structure component of claim 1, wherein the illuminating device is a laser.

3. The exterior structure component of claim 1, wherein the exterior structure component comprises at least one reference axis relative to which the optical fibers at their ends situated in the illuminated region in each case encompass at least one beam angle, and
wherein the totality of the beam angles spans an angular range that is at least 90 degrees in width.

4. The exterior structure component of claim 1, wherein the optical fibers have been combined to form a multitude of fiber bundles, each comprising at least one discrete beam direction, and
wherein the beam directions of all the fiber bundles put together encompass at least one predetermined beam angle range.

5. The exterior structure component of claim 1, further comprising a translucent layer on the exterior surface in the illuminated region.

6. The exterior structure component of claim 5, wherein the translucent layer comprises a curved surface that causes diffusion of the emitted light.

7. The exterior structure component of claim 1, further comprising a phosphorescent layer arranged on the exterior surface of the exterior structure component in the illuminated region, which phosphorescent layer is excited to become luminous by impinging light beams from the optical fibers.

8. The exterior structure component of claim 1, wherein the exterior structure component is configured as a wing-end shape for a wing of an aircraft.

9. The exterior structure component of claim 1, wherein the exterior structure component is configured as a vertical stabilizer section of an aircraft.

10. An aircraft, comprising at least one exterior structure component with an illuminating device, the structural component comprising:
a structure with an interior side and an exterior surface with at least one illuminated region; and
a multitude of optical fibers extending from the interior side to the at least one illuminated region of the exterior surface,
wherein the optical fibers end on the interior side of the exterior structure component in a common interface area couplable to an illuminating device
wherein the structure is made from a semi-finished structural product of a fiber composite material in which the optical fibers have been integrated, and
wherein for increasing the strength of the structure each optical fiber is sewn into the semi-finished structural product by multiply piercing the semi-finished structural product such that each optical fiber alternately extends from the interior side of the structure to the exterior surface in the illuminated region.

11. A method for manufacturing an exterior structure component with an illuminating device, comprising:
manufacturing a structure of the exterior structure component with an interior side and an exterior surface with at least one illuminated region,
simultaneously or subsequently integrating a multitude of optical fibers in the structure for increasing the strength of the structure, each optical fiber is sewn into the structure by multiply piercing the structure in such a manner that the each optical fiber alternately extends from the interior side of the structure to the at least one illuminated region of the exterior surface,
wherein the production of a structure comprises the manufacture of a semi-finished structural product from a fiber composite material,
wherein integration of the optical fibers comprises multiple penetrations of the semi-finished structural product with the optical fibers, and
curing the semi-finished structural product.

12. The method of claim 11, wherein the optical fibers, after integration in the structure, project beyond the exterior surface and on completion of the structure said optical fibers are shortened so that the optical fibers are flush with the exterior surface.

13. The method of claim 11, further comprising application of a translucent protective layer at least to the illuminated region.

14. The method of claim 11, further comprising application of a phosphorescent layer to the illuminated region.

* * * * *